US006010791A

United States Patent [19]

Tan et al.

[11] Patent Number: 6,010,791

[45] Date of Patent: Jan. 4, 2000

[54] FUSER BELTS WITH IMPROVED RELEASE AND GLOSS

[75] Inventors: Biao Tan, Rochester; Jiann-Hsing Chen, Fairport; Muhammed Aslam; Charles E. Hewitt, both of Rochester, all of N.Y.

[73] Assignee: Eastman Kodak Company, Rochester, N.Y.

[21] Appl. No.: 09/032,443

[22] Filed: Feb. 27, 1998

[51] Int. Cl.$^7$ .............................. B32B 27/06; G03G 15/20

[52] U.S. Cl. .......................... 428/451; 399/329; 399/333; 399/341; 428/473.5; 430/99

[58] Field of Search ..................................... 428/447, 451, 428/473.5; 399/329, 333, 341; 430/99

[56] References Cited

U.S. PATENT DOCUMENTS

| | | | |
|---|---|---|---|
| 5,089,363 | 2/1992 | Rimai et al. | 430/45 |
| 5,252,534 | 10/1993 | DePalma et al. | 503/227 |
| 5,411,779 | 5/1995 | Nakajima et al. | 428/36.91 |
| 5,723,270 | 3/1998 | Smith et al. | 430/517 |
| 5,778,295 | 7/1998 | Chen et al. | 399/329 |

OTHER PUBLICATIONS

J. Hedrick et al., [*Polymer,* vol. 38, No. 3, pp. 605–613, (1997)].

*Primary Examiner*—D. S. Nakarani
*Attorney, Agent, or Firm*—Doreen M. Wells

[57] ABSTRACT

A fusing belt that comprises: a seamless polyimide substrate; and coated thereon, a surface layer comprising a polyimide-polydimethylsiloxane block copolymer.

17 Claims, 1 Drawing Sheet

FUSER BELTS WITH IMPROVED RELEASE AND GLOSS

CROSS REFERENCE TO RELATED APPLICATIONS

The present invention is related to commonly assigned, concurrently filed U.S. patent applications Ser. No. 09/031,880, filed, Feb. 27, 1998 titled "Fuser Belts with Improved Release and Gloss, by Tan et al. The disclosure of the related application is incorporated herein by reference.

FIELD OF THE INVENTION

The present invention relates to fusing belts used in fusing electrostatographic toner particles to receiver sheets during electrophotographic processes.

BACKGROUND OF THE INVENTION

Electrophotography can be used to create photographic quality multicolor toner images when the toner particles are small, that is, less than about 10 micrometers, and the receivers, typically papers, are smooth. Electrophotography typically involves the steps of charging a photoconductive element, exposing the photoconductive or dielectric element to create an electrostatic latent image, toning the electrostatic image, transferring the toner to a receiver, and fixing the toner to a receiver. A typical method of making a multicolor toner image involves trichromatic color synthesis by subtractive color formation. In such synthesis, successive latent electrostatic images are formed on an element, each representing a different color, and each image is developed with a toner of a different color. Typically, the colors will correspond to each of the three primary colors (cyan, magenta and yellow) and black, if desired. The electrostatic images for each of the colors can be made successively on a photoconductive element by using filters for each color separation to reflect only the light corresponding to each color in the image to the photoconductive element. After developing each color separation, it can be transferred from the photoconductive element successively in registration with the other color toner images to an intermediate transfer member and then all the color toner images can be transferred in one step from the intermediate transfer member to a receiver. After all the color toners have been transferred to the receiver, the toners are fixed or fused to the receiver. To match the photographic quality produced using silver halide technology, it is preferred that these multicolor toner images have high gloss.

Two types of fuser systems have been used for applying heat and pressure to fuse and fix the toner particles to the receiver, namely, fuser roller systems and fuser belt systems. A problem with fuser roller systems has been that the release temperature of the rollers, that is, the temperature at which the receiver sheet leaves the nip of the rollers, is high. The toner then acts as a hot melt adhesive and can cause the receiver sheet to adhere to the roller. One way to improve the release of the toner and receiver from the fuser roller is to apply a silicone release oil to the roller. Release oils have, however, several disadvantages. Some of the release oil can remain with the fused image sheet and give the sheet an oily feel. It is also difficult to write on a sheet that has release oil on its surface and, when the sheet is handled, fingerprints are readily seen. Release oils also can coat the inside of the electrostatographic machine and may affect the machine reliability. Further, the mechanical complexity of the oil delivery system affects the reliability of the machine.

To avoid the use of release oils, it is known to add low molecular weight polyolefins or functionalized fatty waxes to toner compositions to improve the release of toner from fuser rollers. These additives help provide release from the roller surface if the roller has low surface energy. The low molecular weight polyolefins or functionalized fatty waxes, however, tend to coat the surface of the fuser roller, leading to roller failure. It is also difficult to form images having high gloss with fuser rollers.

The above-mentioned problems encountered with fuser rollers can be overcome by using the alternative system—namely, fuser belts. The concept of fuser belts is disclosed, for example, in U.S. Pat. No. 5,089,363 to Rimai et al. The background art discloses several broad classes of materials useful for fuser belts. for example, U.S. Pat. No. 5,089,363 discloses that metal belts coated with highly crosslinked polysiloxanes provide fused toner images having high gloss. Such polymeric release coatings, however, have poor adhesion to the usual belt substrate materials. Also, the coatings wear rapidly when they contact an abrasive surface such as bond paper or uncoated laser print paper under heat and pressure for repeated cycles. U.S. patent application Ser. No. 08/812,370, filed Mar. 5, 1997 discloses that seamless polyimide resin belt having an intermediate layer of a highly crosslinked silicon resin and a surface layer of a silsesquioxane polymer can produce fused toner images of high gloss and has good release properties without the use of a release oil. However, having an intermediate layer increases the fuser belt cost and complicates the manufacturing process.

There is a need for a fuser belt that can form a fused toner image of high gloss, that is also durable and that readily releases toner images without requiring a silicone or other type of release oil. It is also desirable that such an overcoat be a single layer and made with cost-effective materials.

SUMMARY OF THE INVENTION

The present invention provides an improved means for fusing and fixing thermoplastic toners which avoids or reduces the problems mentioned above. The fusing means comprises a fusing belt that comprises: a seamless polyimide substrate; and coated thereon, a surface layer comprising a polyimide-polydimethylsiloxane block copolymer.

Also provided is a method of forming a fused thermoplastic toner image on a receiver sheet comprising the steps of: providing a fusing apparatus having a moving fusing belt engaged in pressure contact with another belt or roller; passing the receiver sheet bearing toner through a nip formed by the contact of the fusing roller with the other belt or roller; fusing the toner on the receiver sheet to form a toner image; cooling the belt; and separating the receiver sheet from the belt to obtain a sheet bearing a fused toner image having a 20° gloss of 70–120.

The surface layer of the fusing means comprises a copolymer, namely, pyromellitic dianhydride (PMDA)/oxydianiline (ODA) polyimide with polydimethylsiloxane (PDMS) copolymer, which is easy to synthesise and is crystalline in nature. The copolymer has inherent excellent thermal and thermal-oxidative properties and provides the combination of good mechanical property from the polyimide moiety and good release properties from the polydimethylsiloxane moiety. In the method of the invention, a receiver sheet bearing unfused thermoplastic toner is passed through the nip of a belt fuser apparatus in contact with the polyimide-PDMS copolymer surface layer of a fusing belt of the invention, thereby fusing the toner onto the receiver and forming a fused toner image. The moving belt is cooled, and the receiver sheet is separated from the cooled belt to obtain a sheet bearing a fused toner image having a 20° gloss of at least 70. The method also includes fusing the toner and separating the receiver sheet from the belt, without the use of a release oil.

One advantage of a polyimide fusing belt over other belts is that a polyimide belt cools more rapidly than a metal belt after it leaves the heated nip of the fuser system, e.g., zone A in the apparatus shown in FIG. 1.

Another advantage is that polyimide is highly flexible and can be handled more easily than metal without forming kinks. Yet another advantage is that a polyimide belt adheres well to polyimide-PDMS copolymer coatings and is less subject to delamination than other belt materials. In general, therefore, a polyimide belt is less subject to image defects than fusing belts of other materials.

DETAILED DESCRIPTION OF THE INVENTION

Figure 1:
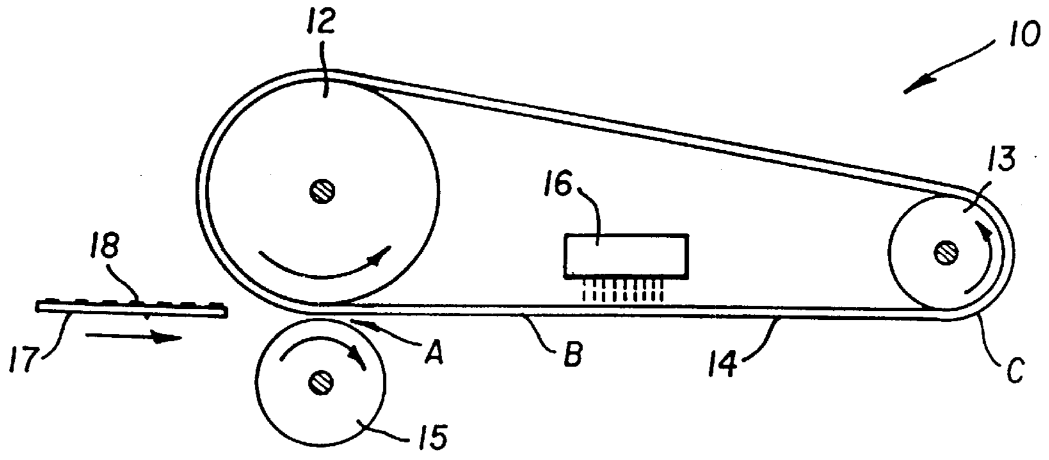
FIG. 1 is a schematic illustration of a toner fusing apparatus in which the fusing belt of the invention can be used.
Figure 2:
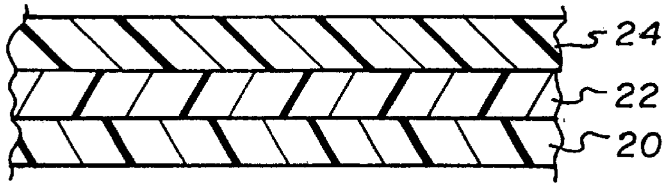
FIG. 2 is a cross-sectional view of the same illustration.

The fuser belt of the invention can be of any size and can be used in any kind of fuser belt system. For example, the fuser belt system can comprise a fuser belt that is trained around two or more rollers, and is in pressure contact with another belt or a roller. The receiver sheet bearing toner is passed through a nip formed by the contact of the fusing roller with the other belt or roller. FIGS. 1 and 2 illustrate suitable configurations for a fuser belt apparatus 10 having a fuser belt 14 of the invention, with which the method of the invention can be practiced. The apparatus 10 includes a heating roller 12 and an unheated roller 13 around which belt 14 is trained and is conveyed in the direction indicated by arrows on rollers 12 and 13. Backup roller 15 presses against the belt and the heating roller 12. The fuser belt 14 is cooled by impinging air from blower 16 positioned above belt 14. In operation, a receiver sheet 17 of paper or plastic bearing unfused thermoplastic toner powder 18 is moved in the direction of the arrow through the nip between heating roller 12 and backup roller 15, which can optionally also be heated and enters a fusing zone A extending about 0.25 to 2.5 cm, preferably about 0.6 cm, laterally along the fuser belt 14. After the toner is fused in zone A, the sheet 17 continues along the path of the moving belt 14 and into the cooling zone B, extending 5 to 50 cm in the region from zone A to roller 13. In cooling zone B, belt 14 is cooled slightly upon leaving heating roller 12 and then is further cooled in a controlled manner by air that impinges upon the belt from blower 16. Sheet 17 separates from belt 14 as the belt passes around roller 13 and is transported to a copy collection means such as a tray (not shown). Sheet 17 is separated from belt 14 within the release zone C at a relatively low temperature at which no toner offset onto the belt occurs.

In accordance with the present invention, the fuser belt 14 is a seamless polyimide belt having a novel combination of coating, which will be described hereinafter. An important advantage of a polyimide as a substrate for the coated belt is that it can be fabricated as a seamless belt, thus avoiding the disadvantage of belts having seams, in that the seams become visible in the toner image.

Polyimides useful as fusing belts substrate are disclosed in U.S. Pat. No. 5,411,779, which is incorporated herein by reference. As disclosed in the cited patent, the polyimide can be prepared in tubular or belt form by coating a poly(amic acid) solution on the inner circumference of a cylinder and imidizing the poly(amic acid) to form a tubular inner layer of the polyimide resin. The poly(amic acid) can be obtained by reacting a tetracarboxylic dianhydride or derivative thereof with an approximately equimolar amount of a diamine in an organic polar solvent. Examples of tetracarboxylic dianhydrides, diamines, solvents and reaction procedures are disclosed in the cited patent, especially in columns 4–6 and in the numbered examples.

Although polyimide belts have the advantages mentioned above, an uncoated polyimide belt has less than optimum release qualities for fused thermoplastic toners. A need exists for a coating that not only releases well from fused thermoplastic toner, but also adheres well to a polyimide belt under the stress of repeated heating, cooling and flexing. The present invention provides such a coating with the desired properties. More specifically, the coating is a polyimide based material which inherently has and confers the above mentioned advantages to fuser belts. The polyimide is modified by incorporating PMDS to enhance release properties. Introduction of low surface energy polydimethylsiloxane blocks into the polyimide backbone produces a polyimide-polydimethylsiloxane copolymer having a continuous phase of polyimide to ensure excellent mechanical properties and polydimethylsiloxane domains to ensure low surface energy.

The synthesis of such polyimide-PDMS copolymers has been disclosed for other applications. J. Hedrick et al., [Polymer, Vol. 38, No. 3, pp 605–613, (1997)] reported the synthesis of PMDA/ODA-PDMS copolymer by poly(amic-alkyl ester) route to achieve reduced residual thermal stress in films. U.S. Pat. Nos. 5,252,534 and 5,723,270 teach the synthesis of Hexafluoroisopropylidene-2,2-bis-phthalic anhydride (6F)/1H-Inden-5-amine, 3 -(4-aminophenyl)-2,3-dihydro- 1,1,3-trimethyl-, (+)- (9CI) (Nv) polyimide-PDMS (6F/Nv-PDMS) copolymers for thermal slip layers and lubrication for film backings. The current invention discloses the synthesis of a PMDA/ODA-PDMS copolymer as an overcoat for an imide belt. Since both the belt substrate and the overcoat are polyimide based polymers, the adhesion of the coating to the belt is superior.

The copolymer was synthesized by a classical two step polyimide synthesis method. The first step involves the reactions of an aromatic tetracarboxylic acid anhydride with a mixture of aromatic diamine and amino terminated polydimethylsiloxane (PDMS-$NH_2$) prepolymer. The polyimide block is made from dianhydrides chosen from pyromellitic dianhydride (PMDA), 3,3',4,4'-biphenyl tetracarboxylic dianhydride (BPDA), 3,3',4,4'-benzophenone tetracarboxylic dianhydride (BTDA), 2,2'-bis-(3,4-dicarboxyphenyl) hexafluoropropance dianhydride (6FDA), 4,4'-oxydiphthalic anhydride (ODPA), 3,3',4,4'-diphenylsulfone tetracarboxylic dianhydride; and aromatic diamines from oxydianiline (ODA), 3,3'-diaminodiphenyl sulfone (m-DDS), p- or m-phenylene diamine (PD), 2,4-toluene diamine (TDA), 2,2'-bis(4-aminophenyl)hexafluoropropane (BisA-AF), methylene dianiline (MDA), 1,3- or 1,4-bis(4-aminophenoxy) benzene (TPE). The polydimethylsiloxane block is from amino-terminated PDMS (PDMS-$NH_2$) prepolymer has a number average molecular weight from 500–20,000 g/mole. The block copolymer has the mole ratio of aromatic diamine to PDMS-$NH_2$ at 1:0.0001 to 1:10. More preferably, the overcoat is PMDA/ODA-PDMS block copolymer, with the PDMS block having a number average molecular weight of 4,500 g/mole. The block copolymers have the mole ratios of diamine to PDMS-$NH_2$ within a ange of 1:0.01 to 1:0.04, which results in an end copolymer having a PDMS block with 5–25% by weight. The end copolymer has a number average molecular weight higher than 4,000 g/mole. With total equal molar amount of dianhydride and diamine, the end copolymer should have a much higher molecular weight—up to about 100,000 g/mole. The reaction is shown in Scheme I. The end copolymer usually provides a coating which produces fused toner images having a G-20 gloss of 70–120. The fuser belts with the invention have a surface energy of 20–35 erg/cm$^2$.

EXAMPLE 1

5% PDMS/PMDA/ODA Polyimide Polydimethylsiloxane Copolymer

Synthesis

A 500 ml 3-neck round bottom flask was dried at 110° C. overnight prior to use. The flask was connected with an overhead mechanical stir bar, an argon inlet and a condenser/outlet. The PDMS- $NH_2$ (1.26 g) was charged into the flask with 100 ml of THF. ODA (11.423 g) was then charged into the flask with 50 ml of NMP. The mixture was stirred under

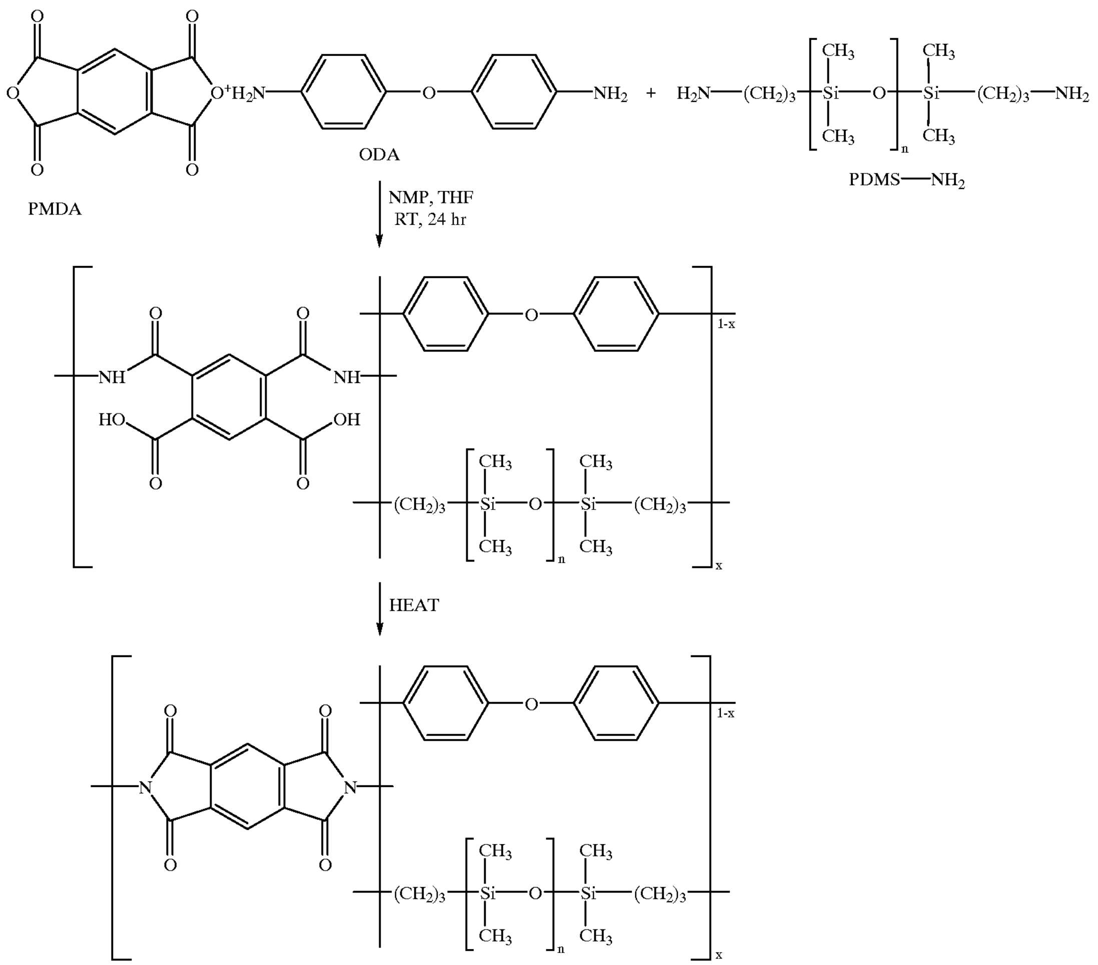

argon until all solids were dissolved. Next, PMDA (12.512 g) was added to the flask with 75 ml of NMP. The mixture was continuously stirred and an opaque and viscous solution was formed after about 30 minutes. The reaction mixture was stirred under argon for another 12 hours (See Reaction Scheme I). The final copolymer in polyamic acid form in NMP/THF was used for further blade coating, screening and belt overcoat test as illustrated by the following Methodology/Test section.

Methods for preparing the coating and examples of the invention follow.

Materials

Pyromellitic Dianhydride (PMDA), 99.5%—Chriskev Company, Inc., Leawood, Kans.

4,4'-Oxydianiline (ODA), 99+%—Aldrich, Milwaukee, Wis.

Aminopropyl terminated polydimethylsiloxane (PDMS-$NH_2$), Mn=4450g/mole— Toray Dow Corning, Co., Japan 1-Methyl-2-pyrrolidinone (NMP), 99.5% anhydrous-Aldrich, Milwaukee, Wis.

Tetrahydrofuran (THF), 99.9% anhydrous—Aldrich, Milwaukee, Wis.

Polyimide belt—Gunze, Co., Japan

EXAMPLE 2

10% PDMS/PMDA/ODA Polyimide Polydimethylsiloxane Copolymer

Synthesis

A 500 ml, 3-neck round bottom flask was dried at 110° C. overnight prior to use. The flask was connected with an overhead mechanical stir bar, an argon inlet and a condenser/outlet. The PDMS- $NH_2$ (2.5 g) was charged into the flask with 100 ml of THF. ODA (10.715 g) was then charged into the flask with 50 ml of NMP. The mixture was stirred under argon until all solids were dissolved. Next, PMDA (11.795 g) was added to the flask with 75 ml of NMP. The mixture was stirred continuously and an opaque and viscous solution was formed after about 30 minutes. The reaction mixture was stirred under argon for another 12 hours (See Reaction Scheme I below). The final copolymer in polyamic acid form in NMP/THF was used for further blade coating, screening and belt overcoat test as illustrated by the following methods.

Methodology/Tests

Casting film on Belt Substrate

The final reaction mixture of Example 1 was poured slowly onto a 5'×7' piece of polyimide belt substrate film. Then the solution was blade (8 mil thick blade) coated onto the film, dried and cured as follows:

70° C. to 150° C., 1 hr

150° C., 1 hr

150° C. to 250° C., 1 hr

250° C., 1 hr

Measuring the Surface Energy of the Casted film

Surface energy was measured by AST products VCA-2500XE Surface energy analyzer. Polar and dispersive forces were measured using water and diiodomethane, respectively. The total force (dynes/$cm^2$) was reported.

Test Release Property of the Casted film

The fusing device was preheated to 250° F. The test sample was the Ricoh toner (C,Y,M or B) on King James paper with a 2"×4" coated fuser belt face down on the toned image. The sample was placed into nip area and run through the fuser. After fusing, the sample was cooled 10 seconds and peeled apart by hand. The release and offset was visually checked on both belt sample and toned image. A good, fair or poor rating was given on the release.

Good=Easy to peel after fusing and no toner offset

Fair=Easy to peel after fusing with very litter toner offset

Poor=Hard to peel and many toner offset

Measure the G20 Gloss of the Image and Coatings

Gloss of the fused belt sample and toned image were measured using a BYK Gardner Micro Gloss Meter at a setting of 20°, according to the procedure of ASTM-D523.

Adhesion

Adhesion of the coating to the imide belt substrate was checked both before and after fusing by hand folding the sample and visually checking the adhesion. The rating was given as follows:

Good=no crack at folded area

Fair=very small delamination on folded area

Poor=loose and easily peel off without folding

Belt overcoat life test

A seamless and uncoated polyimide resin belt 823mm (32.4 inches) in diameter and 254 mm (10 inches) in width, manufactured by Gunze Co., was cleaned with anhydrous ethanol and wiped with a lint-free cloth. The product solution of Example 1 was diluted with solvent (NMP:THF=1:1) to 2 solid % and stirred for 10 minutes. The resulting solution was ring coated on the polyimide belt at a coating speed of 0.072 inch/second, and the coated belt was flashed at room temperature for 20 minutes. The belt was than cured at the following ramps:

100° C., 2 hr

100° C. to 250° C., 1 hr

250° C., 1 hr

The cured coated belt had a smooth and almost clear finish. In an apparatus substantially as shown in FIG. 1 but having an air knife cooling means operating at 35 psig, the belt was tested without the use of a release oil for the fusing of Ricoh NC 5006 toner to sheets of laser print paper at a speed of 1.5 inches per second. The fusing temperature was 250° F., the release temperature was 100° F., and the nip pressure over a distance of 0.240 inches was 35 psig at 240° F. The resulting fused images had a 20° gloss of 76. No sticking or other failure was observed after 3500 copies even though no release oil was used.

Comparative Example A

A piece of 5'×7' polyimide belt substrate film (no overcoat) was used for surface energy measurement, release test and gloss measurement as described above. The results are summarized in Table 1. The high surface energy (51.3) of the belt failed to release toner adequately.

Comparative Example B

PMDA/ODA Polyimide

Synthesis

A 500 ml 3-neck round bottom flask was dried at 110° C. overnight prior to use. The flask was connected with an overhead mechanical stir bar, an argon inlet and a condenser/outlet. ODA (11.607 g) was charged into the flask with 100 ml of NMP. The mixture was stirred under argon until all solids were dissolved. Next, PMDA (12.645 g) was added to the flask with 118 ml of NMP. The mixture was continuously stirred and a clear and viscous solution was formed after about 30 minutes. The reaction was stirred under argon for another 12 hours.

The reaction mixture was used for screening tests; the results are shown in (Table 1).

TABLE 1

Imide-PDMS Copolymer Screening Results

| Example | Formula | Coating Solvent | Substrate | Adhesion | Surface Energy | Release | G20 Gloss Image | G20 Gloss Coating |
|---|---|---|---|---|---|---|---|---|
| Comp. A | Blank Imide Belt | — | Imide Belt | — | 51.3 | Fair | 42 | 75 |
| Comp. B | PMDA/ODA | NMP | Imide Belt | Good | 46.1 | Good | 68 | 120 |
| Ex. 1 | 5% PDMS/PMDA/ODA | NMP/THF | Imide Belt | Good | 31.7 | Good | 76 | 79 |
| Ex. 2 | 10% PDMS/PMDA/ODA | NMP/THF | Imide Belt | Good | 28.3 | Good | 82 | 87 |

The above test results are summarized in Table 1. The overcoat with 5 or 10% PDMS had a very glossy finish and the surface energies were low. The release property was good due to the low surface energy. Both image and coating had high gloss value indicating that the invention is well suited for use as belt fuser overcoat. The invention also provides the overcoat without primer which is cost-effective for manufacturing such novel combination of materials. The overcoat is an inherently thermal and oxidative stable material and the life test of Example 1 materials indicate it did survive the high temperature fusing condition. On the other hand, the imide belt without an overcoat (Comparative Example A), and even the imide belt with an overcoat but without the PDMS block (Comparative Example B), have high surface energies and are not suitable for belt fuser.

The invention has been described in detail with particular reference to certain preferred embodiments thereof, but it will be understood that variations and modifications can be effected within the spirit and scope of the invention.

What is claimed is:

1. A fusing belt that comprises:

a seamless polyimide substrate; and coated thereon a surface layer comprising a polyimide-polydimethylsiloxane block copolymer.

2. A toner fusing belt according to claim 1 wherein the polyimide block is made from dianhydride and aromatic diamine prepolymers.

3. A toner fusing belt according to claim 1 wherein the polydimethylsiloxane block is from amino-terminated polydimethylsiloxane (PDMS- NH2) prepolymer.

4. A toner fusing belt according to claim 2 wherein the dianhydride is selected from pyromellitic dianhydride; 3,3',4,4'-biphenyl tetracarboxylic dianhydride; 3,3',4,4'-benzophenone tetracarboxylic dianhydride; 2,2'-bis-(3,4-dicarboxyphenyl)hexafluoropropan e dianhydride; 4,4'-oxydiphthalic anhydride; and 3,3',4,4'-diphenylsulfone tetracarboxylic dianhydride.

5. A toner fusing belt according to claim 2 wherein the aromatic diamine is selected from oxydianiline; 3,3'-diaminodiphenyl sulfone (m-DDS); p- or m- phenylene diamine; 2,4-toluene diamine; 2,2'-bis(4-aminophenyl) hexafluoropropane (BisA-AF); methylene dianiline; 1,3-bis(4-aminophenoxy) benzene; and 1,4-bis(4-aminophenoxy) benzene.

6. A toner fusing belt according to claim 1 wherein the polydimethylsiloxane block has a number average molecular weight from 500–20,000 g/mole.

7. A toner fusing belt according to claim 2 or 3 wherein the copolymer is made from equimolar amounts of dianhydride and diamine; where diamine is the total amount of aromatic diamine and $PDMS-NH_2$ prepolymer.

8. A toner fusing belt according to claim 2 or 3 wherein the polyimide-polydimethylsiloxane copolymer has a mole ratio of 1:0.0001 to 1:10 with respect to aromatic diamine: $PDMS- NH_2$.

9. A toner fusing belt according to claim 8 wherein the polyimide-polydimethylsiloxane copolymer has a mole ratio of 1:0.01 to 1:0.04 with respect to aromatic diamine: $PDMS-NH_2$.

10. A toner fusing belt according to claim 1 wherein the surface layer is a PMDA/ODA-PDMS block copolymer.

11. A toner fusing belt according to claim 10 wherein the PDMS block has a number average molecular weight of 4,500 g/mole.

12. A toner fusing belt according to claim 1 wherein the copolymer has a number average molecular weight of 4,000 to 100,000 g/mole.

13. A fuser belt of claim 1 which produces fused toner images having a G-20 gloss of 70–120.

14. A fuser belt of claim 1 wherein the surface layer has a surface energy of 20–35 $erg/cm^2$.

15. A method of forming a fused thermoplastic toner image on a receiver sheet comprising the steps of:

providing a fusing apparatus having a moving fusing belt as defined in claim 1 engaged in pressure contact with another belt or roller;

passing the receiver sheet bearing toner through a nip formed by the contact of the fusing roller with the other belt or roller;

fusing the toner on the receiver sheet to form a toner image;

cooling the belt; and separating the receiver sheet from the belt to obtain a sheet bearing a fused toner image having a 20° gloss of 70–120.

16. A method according to claim 15 wherein the receiver sheet is separated from the fusing belt without the use of a release oil.

17. A method of forming a fused thermoplastic toner image on a receiver comprising:

passing the receiver bearing toner through a nip formed between a fusing belt and a roller to form a fixed toner image having a 20° gloss of 70–120, said fusing belt being as defined in claim 1.

* * * * *